United States Patent
Gotoh et al.

(10) Patent No.: US 7,527,748 B2
(45) Date of Patent: *May 5, 2009

(54) PHOSPHOR AND PHOSPHOR FILM FOR ELECTRON BEAM EXCITATION AND COLOR DISPLAY APPARATUS USING THE SAME

(75) Inventors: Masahiro Gotoh, Tokyo (JP); Akira Nagatomi, Tokyo (JP); Kenji Sakane, Tokyo (JP); Shuji Yamashita, Tokyo (JP)

(73) Assignees: DOWA Electronics Materials Co., Ltd., Tokyo (JP); Nichia Corporation, Anan-shi (JP)

(*) Notice: Subject to any disclaimer, the term of this patent is extended or adjusted under 35 U.S.C. 154(b) by 279 days.

This patent is subject to a terminal disclaimer.

(21) Appl. No.: 11/194,590

(22) Filed: Aug. 2, 2005

(65) Prior Publication Data

US 2007/0029525 A1    Feb. 8, 2007

(30) Foreign Application Priority Data

Aug. 2, 2004  (JP) ............................. 2004-225688
Mar. 16, 2005 (JP) ............................. 2005-075840

(51) Int. Cl.
*H01L 33/00*  (2006.01)
*H05B 33/14*  (2006.01)
*C09K 11/64*  (2006.01)
*C09K 11/59*  (2006.01)
*C09K 11/08*  (2006.01)
*C09K 11/55*  (2006.01)

(52) U.S. Cl. .................... 252/301.4 F; 252/301.6 F; 313/486; 313/467; 313/461; 313/468

(58) Field of Classification Search ........... 252/301.4 F, 252/301.6 F; 313/486, 487, 461, 468, 467
See application file for complete search history.

(56) References Cited

U.S. PATENT DOCUMENTS 18,985 A    12/1857   Olds (Continued)

FOREIGN PATENT DOCUMENTS

EP           1 296 376 A2   3/2003

(Continued)

OTHER PUBLICATIONS

Uheda et al, "The Crystal Structure and Photoluminescence Propeties of a New red Phosphor, Calium Aluminum Silicon Nitride doped with Divalent Europium", 206th Meeting of Electrochemical Society, Oct. 3, 2004.*

(Continued)

*Primary Examiner*—C. Melissa Koslow
(74) *Attorney, Agent, or Firm*—Oliff & Berridge, PLC (57) ABSTRACT

To provide a phosphor for an electron beam excitation with a small deterioration in an emission efficiency and capable of maintaining a high luminance, even when an excitation density of an electron beam for a phosphor excitation is increased. As raw materials, $Ca_3N_2(2N)$, $AlN(3N)$, $Si_3N_4$ (3N), and $Eu_2O_3(3N)$ are prepared, and the raw materials thus prepared are measured and mixed, so that a molar ratio of each element becomes (Ca+Eu):Al:Si=1:1:1. Then, the mixture thus obtained is maintained and fired for at 1500° C. for 3 hours, and thereafter crushed, to manufacture the phosphor having a composition formula $Ca_{0.985}SiAlN_3:Eu_{0.015}$.

8 Claims, 3 Drawing Sheets

U.S. PATENT DOCUMENTS

| | | | |
|---|---|---|---|
| 2,121,275 A | 6/1938 | Zober et al. | |
| 3,527,595 A | 9/1970 | Adler et al. | |
| 3,697,301 A * | 10/1972 | Donofrio et al. | 428/334 |
| 4,477,689 A | 10/1984 | Ogasahara et al. | |
| 4,576,736 A | 3/1986 | Harmuth | |
| 5,398,398 A | 3/1995 | Williams et al. | |
| 5,447,291 A | 9/1995 | Sandhage | |
| 5,600,202 A * | 2/1997 | Yamada et al. | 313/467 |
| 6,180,029 B1 * | 1/2001 | Hampden-Smith et al. | 252/301.4 R |
| 6,504,297 B1 * | 1/2003 | Heo et al. | 313/467 |
| 6,670,748 B2 * | 12/2003 | Ellens et al. | 313/503 |
| 7,138,756 B2 * | 11/2006 | Gotoh et al. | 313/467 |
| 7,252,788 B2 * | 8/2007 | Nagatomi et al. | 252/301.4 F |
| 2002/0043926 A1 | 4/2002 | Takahashi et al. | |
| 2003/0030038 A1 | 2/2003 | Mitomo et al. | |
| 2003/0030368 A1 | 2/2003 | Ellens et al. | |
| 2003/0094893 A1 | 5/2003 | Ellens et al. | |
| 2003/0132422 A1 | 7/2003 | Tian et al. | |
| 2003/0152804 A1 | 8/2003 | Miura et al. | |
| 2003/0213611 A1 | 11/2003 | Morita | |
| 2004/0155225 A1 * | 8/2004 | Yamada et al. | 252/301.4 R |
| 2004/0263074 A1 | 12/2004 | Baroky et al. | |
| 2005/0001225 A1 | 1/2005 | Yoshimura et al. | |
| 2005/0189863 A1 | 9/2005 | Nagatomi et al. | |
| 2005/0203845 A1 | 9/2005 | Yoshimine et al. | |
| 2005/0205845 A1 | 9/2005 | Deising et al. | |
| 2005/0253500 A1 | 11/2005 | Gotoh et al. | |
| 2005/0267243 A1 | 12/2005 | Amasaki et al. | |
| 2006/0006782 A1 | 1/2006 | Nagatomi et al. | |
| 2006/0017365 A1 | 1/2006 | Nagatomi et al. | |
| 2006/0021788 A1 | 2/2006 | Kohayashi et al. | |
| 2006/0022573 A1 | 2/2006 | Gotoh et al. | |
| 2006/0033083 A1 | 2/2006 | Sakane et al. | |
| 2006/0043337 A1 * | 3/2006 | Sakane et al. | 252/301.4 R |
| 2006/0045832 A1 * | 3/2006 | Nagatomi et al. | 423/325 |
| 2006/0065878 A1 | 3/2006 | Sakane et al. | |
| 2006/0076883 A1 | 4/2006 | Himaki et al. | |
| 2006/0091790 A1 * | 5/2006 | Nagatomi et al. | 313/503 |
| 2006/0170332 A1 | 8/2006 | Tamaki et al. | |
| 2006/0197432 A1 | 9/2006 | Nagatomi et al. | |
| 2006/0197439 A1 | 9/2006 | Sakane et al. | |
| 2006/0220047 A1 | 10/2006 | Nagatomi et al. | |
| 2006/0220520 A1 | 10/2006 | Sakane et al. | |
| 2006/0244356 A1 | 11/2006 | Nagatomi et al. | |
| 2007/0007494 A1 * | 1/2007 | Hirosaki et al. | 252/301.4 R |
| 2007/0029525 A1 | 2/2007 | Gotoh et al. | |
| 2007/0164308 A1 | 7/2007 | Yoshimura et al. | |

FOREIGN PATENT DOCUMENTS

| | | |
|---|---|---|
| EP | 1 445 295 A1 | 8/2004 |
| JP | 05-015655 | 1/1993 |
| JP | 05-198433 | 8/1993 |
| JP | 11-144938 | 5/1999 |
| JP | 11-277527 | 10/1999 |
| JP | A 2000-73053 | 3/2000 |
| JP | 2000-153167 | 6/2000 |
| JP | 2001-214162 | 8/2001 |
| JP | 2002-363554 | 12/2002 |
| JP | A 2003-13059 | 1/2003 |
| JP | 2003-096446 | 4/2003 |
| JP | 2003-124527 | 4/2003 |
| JP | 2003-515655 | 5/2003 |
| JP | 2003-277746 | 10/2003 |
| JP | 2003-336059 | 11/2003 |
| JP | 2004-055536 | 2/2004 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-189997 | 7/2004 |
| JP | A-2004-186278 | 7/2004 |
| JP | 2004-235598 | 8/2004 |
| JP | 2004-244560 | 9/2004 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| JP | A-2006-282809 | 10/2006 |
| JP | A-2006-282872 | 10/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 * | 7/2004 |
| WO | WO 2004/055910 A1 | 7/2004 |
| WO | WO 2005/052087 * | 6/2005 |
| WO | WO 2005/052087 A1 | 6/2005 |
| WO | WO 2006/093298 A1 | 9/2006 |

OTHER PUBLICATIONS

K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

U.S. Appl. No. 11/194,590, filed Aug. 2, 2005.

"Phosphor Handbook"; (compiled by Phosphor Research Society, published by Ohmusha, Ltd., 1987); pp. 172-176.

JIS Z 8726; "Method of Specifying Colour Rendering Properties of Light Sources"; (1990).

* cited by examiner

PHOSPHOR AND PHOSPHOR FILM FOR ELECTRON BEAM EXCITATION AND COLOR DISPLAY APPARATUS USING THE SAME

TECHNICAL FIELD OF THE INVENTION

The present invention relates to a phosphor emitting light by an electron beam excitation, and particularly to a phosphor and a phosphor film for an electron beam excitation which can be suitably used in a display apparatus, in which an electron beam is used, such as a color cathode ray tube and a field emission display (referred to as "FED" hereafter), and a color display apparatus using the same.

BACKGROUND ART

A phosphor for an electron beam excitation emitting light under an excitation of an electron beam has been conventionally used for a color cathode ray tube, and also used for FED serving as a flat panel display which has been developed recently. As the phosphor for the electron beam excitation used in the color display apparatus such as the color cathode ray tube and the FED, ZnS:Ag, Cl are known as a blue phosphor, and ZnS:Cu, Al are known as a green phosphor. Also, $Y_2O_2S:Eu^{3+}$, and $Y_2O_3:Eu^{3+}$, $YVO_4:Eu^{3+}$ are known as a red phosphor. Among these phosphors, the $Y_2O_2S:Eu^{3+}$ is most generally used in the known color cathode ray tube, for the reason that it has an excellent emission color and exhibits high emission luminance.

In association with a request to the color cathode ray tube of recent years, for a further improved resolution and a high contrast of a display image, an approach is taken to increase an excitation density of the electron beam with which the phosphor is irradiated. However, when the $Y_2O_2S:Eu^{3+}$ is used as the red phosphor, even if the excitation density of the electron beam is increased, a phenomenon of a luminance saturation is generated, in which a saturation occurs when the luminance is increased over a fixed value. This is because a temperature quenching phenomenon occurs in the red phosphor by a temperature increase of the phosphor film. Under the saturation phenomenon of the luminance, an emission efficiency of the red phosphor in the color cathode ray tube is deteriorated, thereby also deteriorating an image quality of a display screen during operating of the color cathode ray tube, further involving a problem that chromaticness of white color, which is displayed with a mixed color of RGB, is largely changed by the deterioration of the luminance in red light.

In order to prevent the saturation phenomenon of the luminance, there has been several proposals. For example, according to a non-patent document 1, by slightly adding $Tb^{3+}$ or $Pr^{3+}$ to the $Y_2O_2S:Eu^{3+}$, the luminance saturation hardly occurs. Also, according to the patent document 1, by adding either of or both of the $Tb^{3+}$ and $Pr^{3+}$, and further by slightly adding Ca to the $Y_2O_2S:Eu^{3+}$, the luminance is increased. Also, according to the patent document 2, by adding either of or both of the $Tb^{3+}$ and $Pr^{3+}$, and further by slightly adding either of or both of Sm and Nd, to the $Y_2O_2S:Eu^{3+}$, the luminance is increased.

(Non-patent document 1) "Phosphor handbook" (from page 172 to page 176, Phosphor Research Society, published by Ohmsha, co,. in 1987)

(Patent document 1) Japanese Patent Laid Open No. 2003-13059

(Patent document 2) Japanese Patent Laid Open No. 2000-73053

However, in the cathode ray tube used in a high definition television system and a high resolution computer display and so forth, which are color display apparatus of recent years, in order to attain a further improved resolution and high contrast of the display, a request is made to finely pulverize the phosphor. Along with this, there is an increasing trend of the excitation density of the electron beam, with which the phosphor is irradiated. Therefore, it becomes difficult to obtain a sufficient luminance, because the luminance saturation occurs even when the aforementioned improved $Y_2O_2S:Eu^{3+}$ based phosphor is used, involving the problem that a brightness of the screen and a color balance are lost because of an insufficient luminance in the red light, thereby making it difficult to obtain a high quality screen.

SUMMARY OF THE INVENTION

In order to solve the above-described problem, the present invention is provided, and an object of the present invention is to provide a phosphor for an electron beam excitation having an electron beam excitation characteristic of small deterioration in an emission efficiency even when an excitation density of an electron beam is increased, and capable of maintaining a high luminance, and particularly to provide the phosphor for the electron beam excitation having the electron beam excitation characteristic, and emitting red light having a sufficient luminance, and further to provide a color display apparatus using the phosphor for the electron beam excitation.

In order to solve the aforementioned problem, as a result of a strenuous study on a matrix composition of various phosphors by the inventors of the present invention, it is found that the phosphor expressed by the composition formula MmAaBbOoNn:Z (wherein element M is at least one or more kind of element having bivalent valency, element A is at least one or more kind of element having tervalent valency, element B is at least one or more kind of element having tetravalent valency, O is oxygen, N is nitrogen, element Z is the element acting as an activator in the phosphor, satisfying m>0, a>0, b>0, o≧0, n=2/3m+a+4/3b−2/3o.), maintains a light emission with high efficiency and high luminance, even when an excitation density of the electron beam is increased, which leads to attaining the present invention.

Specifically, the present invention takes several aspects as follows.

In a first aspect, a phosphor for an electron beam excitation is provided, which is expressed by a composition formula MmAaBbOoNn:Z (wherein element M is at least one or more kind of element having bivalent valency, element A is at least one or more kind of element having tervalent valency, element B is at least one or more kind of element having tetravalent valency, O is oxygen, N is nitrogen, element Z is the element acting as an activator in the phosphor, satisfying m>0, a>0, b>0, o≧0, n=2/3m+a+4/3b−2/3o.)

In a second aspect, the phosphor for the electron beam excitation according to the first aspect is provided, wherein values of the m, a, b are expressed by m=a=b=1.

In a third aspect, the phosphor for the electron beam excitation according to either of the first aspect or the second aspect is provided, wherein the element M is at least one or more kind of element selected from the group consisting of Mg, Ca, Sr, Ba, and Zn, the element A is at least one or more kind of element selected from the group consisting of B (boron) Al and Ga, the element B is Si and/or Ge, and the element Z is at least one or more kind of element selected from rare earth elements or transitional metal elements.

In a fourth aspect, the phosphor for the electron beam excitation according to any one of the first to third aspects is provided, wherein the element A is Al, and the element B is Si.

In a fifth aspect, the phosphor for the electron beam excitation according to any one of the first to fourth aspects is provided, wherein the element M is Ca, and the element Z is Eu.

In a sixth aspect, the phosphor for the electron beam excitation according to any one of the first to fifth aspects is provided, which is expressed by $CaAlSiN_3$:Eu.

In a seventh aspect, the phosphor for the electron beam excitation according to any one of the first to sixth aspects is provided, wherein the phosphor for the electron beam excitation is in a powdery state.

In an eighth aspect, the phosphor according to the seventh aspect is provided, wherein a mean particle size of the phosphor for the electron beam excitation is not more than 10 μm and not less than 1 μm.

In a ninth aspect, a color display apparatus is provided, using the phosphor for the electron beam excitation according to any one of the first to eighth aspects.

In a tenth aspect, a phosphor film for an electron beam excitation is provided, with a film thickness of 65 μm or less, manufactured by using the phosphor for the electron beam excitation according to any one of the first to eighth aspects.

In an eleventh aspect, an phosphor film for an electron beam excitation is provided, with a phosphor coating amount per unit area is 7.0 mg/cm$^2$ or less, manufactured by using the phosphor for the electron beam excitation according to any one of the first to eighth aspects.

In a twelfth aspect, a color display apparatus is provided, using the phosphor film for the electron beam excitation according to either of the tenth aspect or the eleventh aspect.

The phosphor for the electron beam excitation according to the first to fifth aspects hardly allows the luminance saturation to occur even when the excitation density of the electron beam is increased, and maintains the light emission with high efficiency and high luminance.

The phosphor for the electron beam excitation according to the sixth aspect hardly allows the luminance saturation to occur even when the excitation density of the electron beam is increased, and maintains the light emission with high efficiency and high luminance, and also emits red light having a sufficient luminance.

The phosphor for the electron beam excitation according to the seventh or eighth aspect is in a powdery state, and therefore coating or filling is facilitated.

The phosphor film for the electron beam excitation according to the tenth aspect or the eleventh aspect is capable of exhibiting an extremely strong emission and luminance, even when the excitation density of the electron beam is increased.

The color display apparatus according to the ninth aspect or the twelfth aspect does not allow insufficient luminance to occur in the red light, and a high quality screen can be obtained.

BEST MODE FOR CARRYING OUT THE INVENTION

The phosphor for the electron beam excitation according to the present invention (referred to as simply a phosphor, in some cases) is the phosphor expressed by a composition formula MmAaBbOoNn:Z, wherein the element M is at least one or more kind of element having bivalent valency, element A is at least one or more kind of element having tervalent valency, element B is at least one or more kind of element having tetravalent valency, O is oxygen, N is nitrogen, element Z is at least one or more kind of element acting as an activator in the phosphor, selected from rare earth elements or transitional metal elements. The phosphor according to the present invention having the aforementioned composition hardly allows the luminance saturation to occur, even when the excitation density of the electron beam is increased under the electron beam excitation. This contributes to obtaining the light emission with high efficiency and high luminance.

In addition, when the phosphor takes a chemically stable structure, there hardly occurs an impurity phase not contributing to the light emission, thus suppressing the deterioration in the emission characteristic and therefore a preferable structure is obtained. Here, in order to take a chemically stable structure, preferably the phosphor is expressed by the aforementioned composition formula MmAaBbOoNn:Z, satisfying m>0, a>0, b>0, o≧0, n=2/3m+a+4/3b−2/3o.

Further, preferably the values of m, a, b are expressed by m=a=b=1, wherein the element M is at least one or more kind of element selected from the group consisting of Mg, Ca, Sr, Ba, and Zn, and the element A is at least one or more kind of element selected from the group consisting of B (boron), Al, and Ga, the element B is Si and/or Ge, and the element Z is at least one or more kind of element selected from the rare earth elements or the transitional metal elements.

Further, in the aforementioned composition formula MmAaBbOoNn:Z, wherein m=a=b=1, the element A is Al, and the element B is Si, the phosphor is expressed by a general formula MAlSiOoNn:Z (wherein o≧0, n=3−2/3o), which exhibits a light emission with high efficiency and high luminance under the excitation of the electron beam. In this phosphor, an emission wavelength can be shifted by changing the kind of the element M and the content of O. Therefore when the change of the emission wavelength is requested as the phosphor for the display apparatus such as a display, by changing the kind of the element M and an amount of O, an optimal emission color can be obtained.

Further, in the aforementioned composition formula MAlSiOoNn:Z, wherein o=0, the element M is Ca, and the element Z is Eu, the phosphor is expressed by $CaAlSiN_3$:Eu$^{2+}$. The phosphor thus expressed by the general formula $CaAlSiN_3$:Eu$^{2+}$ exhibits a red emission with particularly high efficiency and high luminance under the excitation of the electron beam, serving as an excellent red phosphor.

In addition, the $Y_2O_2S$:Eu$^{3+}$ based phosphor used in the present many color cathode ray tubes has a red pigment such as $Fe_2O_3$ attached on the surface of the phosphor, to improve the contrast of an image displayed on a display. However, the phosphor expressed by the aforementioned $CaAlSiN_3$:Eu$^{2+}$ efficiently absorbs a visible light with a wavelength of 550 nm or less, and therefore the phosphor itself is colored in red. This contributes to exhibiting an effect of reducing a use amount of the pigment required for improving the contrast.

The present invention provides the phosphor in a powdery state, in consideration of facilitating a coating or a filling. However, it is preferable to make a mean particle size of a powder of the phosphor 10 μm or less. This is because the light emission in the powder of the phosphor appears to mainly occur on a particle surface, and therefore with the mean particle size of 10 μm or less, a surface area per unit weight of the powder can be secured, and the deterioration in luminance can be avoided. Also, with the mean particle size of 10 μm or less, the powder of the phosphor can be made in a paste state, thereby improving a coating density of the powder of the phosphor when it is applied on light emitting elements or the like. From this viewpoint, the deterioration in the luminance can be avoided. Further, from the viewpoint of improving the high resolution of the display, it is preferable to make the mean particle size of the powder of the phosphor 10 μm or less. Meanwhile, according to the study of the inventors of the present invention, although a detailed reason is not clarified, from the viewpoint of the emission efficiency of the powder of the phosphor, it is found that preferably the mean particle size of the powder of the phosphor is larger than 1 μm. As described above, the mean particle size of the powder of the phosphor of the present invention is preferably not less than 1 μm and not more than 10 μm.

Also, in regards to the phosphor film according to the present invention manufactured by using the aforementioned phosphor, the film thickness is preferably 65 μm or less, and a phosphor coating amount per unit area is preferably 7.0 mg/cm$^2$ or less. By thus reducing the film thickness of the phosphor film, a significantly strong light emission and luminance can be exhibited, even when the excitation density of the electron beam is increased under irradiation of the electron beam with high excitation current value. Although a lower limit value of the film thickness of the phosphor film exhibiting the significantly strong light emission and luminance is not clear, it is found from an experiment that 30 μm of film thickness and 3.50 mg/cm$^2$ of phosphor coating amount per unit area are preferable.

When the color display apparatus such as the color cathode ray tube and the FED is manufactured by using the phosphor according to the present invention, the color display apparatus is obtained, in which the deterioration in the emission efficiency is suppressed even when the excitation density of the electron beam is increased, a high screen display luminance can be maintained, and a high image quality screen with excellent brightness of the screen and color balance is realized. When the phosphor according to the present invention is applied to the color display apparatus, the same method as that of the phosphor according to the conventional art can be used in applying to the color display apparatus.

(Manufacturing Method of the Phosphor)

In regards to a manufacturing method of the phosphor according to the present invention, by way of example, the manufacturing method of a case not containing oxygen (namely o=0) in the composition formula MmAaBbOoNn:Z is shown, as being the case of CaAlSiN$_3$:Eu (in the case of Eu/(Ca+Eu) molar ratio=0.015) wherein the element M is Ca, the element A is Al, and the element B is Si, satisfying m=a=b=1 and o=0.

First, as a nitride of Ca, Al, and Si, Ca$_3$N$_2$(2N), AlN(3N) and Si$_3$N$_4$ (3N) are prepared as raw materials. Eu$_2$O$_3$(3N) is also prepared as an Eu raw material.

The raw materials thus prepared are measured and mixed, so that the molar ratio of each element satisfies m=a=b=1. In order to replace a part of a Ca site with Eu, actually the raw materials are measured and mixed so as to satisfy (Ca+Eu):Al:Si=1:1:1. The mixing of the raw materials may be operated by using a usual mixing method using a mortar or the like, it is convenient to operate the mixing in a glove box in an inert atmosphere of nitrogen or the like.

As described above, it is convenient to operate the mixing in the glove box in the inert atmosphere. This is because when the mixing is operated in an atmosphere, the ratio of oxygen concentration contained in a matrix structure element is collapsed by an oxidization and a decomposition of the raw materials, and an emission characteristic is thereby deteriorated, and further the composition of the phosphor thus manufactured is deviated from a target composition. In addition, the nitride of each raw material element is easy to be influenced by humidity, and therefore preferably the inert gas, from which the humidity is adequately removed, is used. When a nitride raw material is used as each raw material element, a dry system is preferably selected as a mixing system, to avoid the decomposition of the raw material. Specifically, it is preferable to adopt a usual dry type mixing method using a ball mill and a mortar.

The raw material thus completed in mixing is filled in a boron nitride crucible as a firing container, and fired in the inert atmosphere of nitrogen or the like. Here, the raw materials are retained and fired at 1000° C. or more, preferably 1400° C. or more. The higher the firing temperature is, the more rapidly the firing is advanced, and the maintaining time is therefore shortened. Meanwhile, even when the firing temperature is low, the target emission characteristics can be obtained by maintaining the temperature for a long time. Therefore, the longer the firing time is, the more rapidly the particle growth is advanced, and the particle size becomes therefore large. Therefore, the firing time may be set in accordance with the target particle size. For example, when the raw materials are fired at 1500° C., preferably the temperature is raised up to 1500° C. at a temperature raising speed of 15° C./min, and thereafter the raw materials are retained at 1500° C. for 3 hours and fired.

After the firing is completed, the fired object is cooled from 1500° C. to 200° C. for 1 hour, further cooled up to a room temperature, and is crushed up to a predetermined mean particle size (preferably 1 μm to 10 μm) by using the mortar and the ball mill, to manufacture the phosphor expressed by the composition formula CaSiAlN$_3$:Eu(Eu/(Ca+Eu) molar ratio=0.015).

Note that by the oxygen from Eu$_2$O$_3$, it appears that a slight amount of oxygen exists in the composition of a generated product, which can be disregarded in a usual case.

When a set value of the Eu/(Ca+Eu) molar ratio is changed, a blending amount of each raw material at mixing is adjusted to a predetermined composition formula, and in the same manufacturing method as described above, the phosphor having the predetermined composition formula can be manufactured.

Next, by way of example, the manufacturing method of CaAlSiOo$_{0.5}$N$_{2.67}$:Eu (wherein Eu/(Ca+Eu) molar ratio=0.015), wherein the element M is Ca, the element A is Al, and the element B is Si, satisfying m=a=b=1, o=0.5, is shown as the manufacturing method of the phosphor including the oxygen (e.g. o≠0) in the composition formula MmAaBbOoNn:Z.

First, as the nitride of Ca, Al, and Si, the raw materials are prepared such as Ca$_3$N$_2$(2N), AlN(3N), and Si$_3$N$_4$(3N), and CaO(2N) as an O raw material. Here, as the O raw material, $Al_2O_3$ and $SiO_2$ and so forth may be used. As the Eu raw material, $Eu_2O_3(3N)$ is prepared.

The raw materials thus prepared are measured and mixed to satisfy m=a=b=1, and o=0.5. In order to replace a part of the Ca site with Eu, actually the raw materials are measured and mixed to satisfy (Ca+Eu):Al:Si=1:1:1. In addition, an amount of O satisfying o=0.5 is adjusted by controlling an adding ratio of $Ca_3N_2$ and CaO, when the CaO is used as the raw material to supply O, for example. Specifically, in order to obtain a target composition $CaAlSiOo_{0.5}N_{2.67}$:Eu (Eu/(Ca+Eu) molar ratio=0.015), each raw material may be measured and mixed to satisfy $Ca_3N_2$:$Eu_2O_3$:CaO:AlN:$Si_3N_4$=(0.985−0.50)/3:0.015/2:0.50:1:⅓. The amount of O may be adjusted by the adding ratio of $Al_2O_3$ and AlN when the $Al_2O_3$ is used as the raw material to supply O, by the adding ratio of $SiO_2$ and $Si_3N_4$ when the $SiO_2$ is used as the raw material to supply O. In the mixing operation, a usual mixing method using the mortar may be adopted. However, it is convenient to operate the mixing in the glove box in the inert atmosphere of nitrogen or the like.

As described above, it is convenient to operate the mixing in the glove box in the inert atmosphere. This is because the nitride in each raw material element is easy to be influenced by humidity, and therefore preferably the inert gas from, which the humidity is adequately removed, is used. When a nitride raw material is used as each raw material element, a dry system is preferably selected as a mixing system, to avoid the decomposition of the raw material. Specifically, it is preferable to adopt a usual dry type mixing method using the ball mill and the mortar.

The raw material thus mixed is put in a crucible, retained in the inert atmosphere such as nitrogen at 1000° C. or more, preferably at 1400° C. or more, further preferably 1500° C. or more for 3 hours, and fired. The higher a sintering temperature is, the more rapidly a sintering is advanced, and the maintaining time is therefore shortened. Meanwhile, even when the sintering temperature is low, the target emission characteristics can be obtained by maintaining the temperature for a long time. However, the longer the firing time is, the more rapidly the particle growth is advanced, and the particle size becomes therefore large. Therefore, the firing time may be set in accordance with the target particle size.

Preferably, the material, which can be used in the inert atmosphere, is used for the crucible, such as BN (boron nitride), alumina, carbon, silicon nitride, aluminum nitride, sialon, SiC, and preferably the crucible with high purity is used. Especially, the BN crucible is capable of averting the intrusion of impurities from the crucible and is therefore preferably used. After the firing is completed, the fired object is taken out from the crucible, and is crushed up to a predetermined mean particle size by using crushing means such as the mortar and the ball mill, to manufacture the phosphor expressed by the composition formula $CaAlSiO_{0.5}N_{2.67}$:Eu. Here, in order to replace the Ca site with Eu, $Eu_2O_3$ is added. Therefore, a part of the nitrogen supposed to be taken in the phosphor from the $Ca_3N_2$ is replaced with the oxygen from $Eu_2O_3$, and the generated product is expressed by the composition formula $CaAlSiO_{0.523}N_{2.66}$:Eu. Accordingly, it appears that a minute deviation is generated in the composition of the oxygen and the nitrogen, which can be ignored in a usual case.

EXAMPLE

The present invention will be specifically explained based on examples.

Example 1

Commercially available $Ca_3N_2(2N)$, AlN(3N), $Si_3N_4(3N)$, $Eu_2O_3(3N)$ were prepared, and each raw material was measured to have the molar ratio of each element satisfying Ca:Al:Si:Eu=0.985:1:1:0.015, and mixed in the glove box in the nitrogen atmosphere by using the mortar. The raw material thus mixed was filled in a boron nitride crucible, and the temperature was raised at a raising speed of 15° C./min up to 1500° C. in the nitrogen atmosphere. The temperature was then maintained and the raw materials were fired for 3 hours at 1500° C., thereafter cooled from 1500° C. to 200° C. for 1 hour, and further cooled up to a room temperature, to obtain the phosphor expressed by the composition formula $Ca_{0.985}AlSiN_3$:$Eu_{0.015}$. The phosphor thus obtained was crushed by using the mortar, and the mean particle size of the powder thus manufactured was 4.65 μm.

Figure 1:
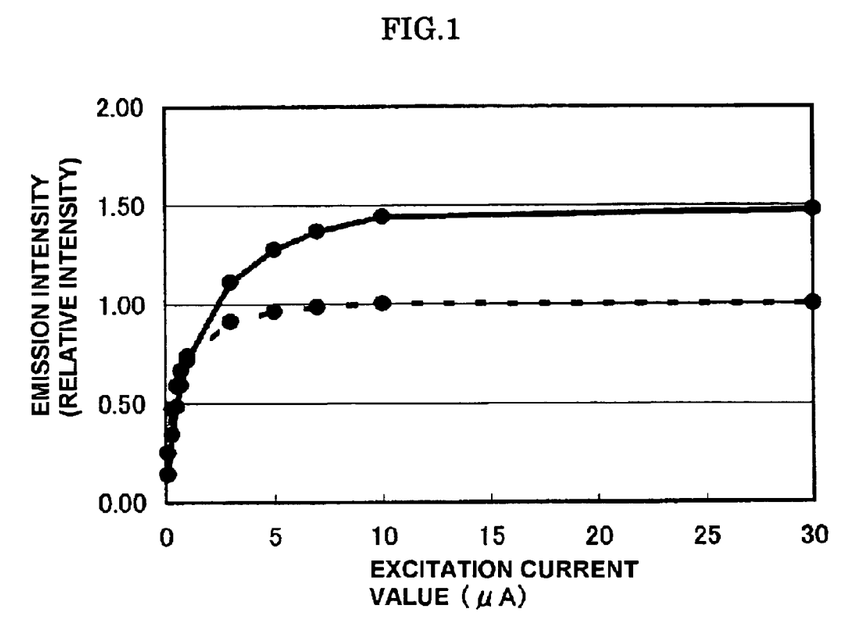
FIG. 1 is a view showing a relation between an excitation current value of an electron beam, with which a phosphor according to an example 1 is irradiated, and an emission intensity of the phosphor.

The powder of the phosphor thus manufactured was dispersed in a solution, and uniformly applied on a copper substrate by using a coagulating-sedimentation process in which a water glass was used, and a substrate sample for evaluating the emission characteristics of the phosphor according to the example 1 was manufactured. The substrate sample thus manufactured was irradiated with the electron beam of an electron beam accelerating voltage value 25 kV and an electron beam irradiating area 8×4 mm, and an emission intensity of the substrate sample when an excitation current value of the electron beam is changed from 0.1 μA to 30 μA was measured. The measurement result is shown in table 1 and FIG. 1, wherein the emission intensity is shown by a relative intensity, which is a standardized value, with the emission intensity defined as 1.00, under a current of 30 μA which is run through the substrate sample of the phosphor according to a comparative example 1 as will be described later. In addition, FIG. 1 is a graph in which the excitation current value is taken on the horizontal axis, the emission intensity (relative intensity) is taken on the vertical axis, and values of table 1 are connected by solid line.

Figure 2:
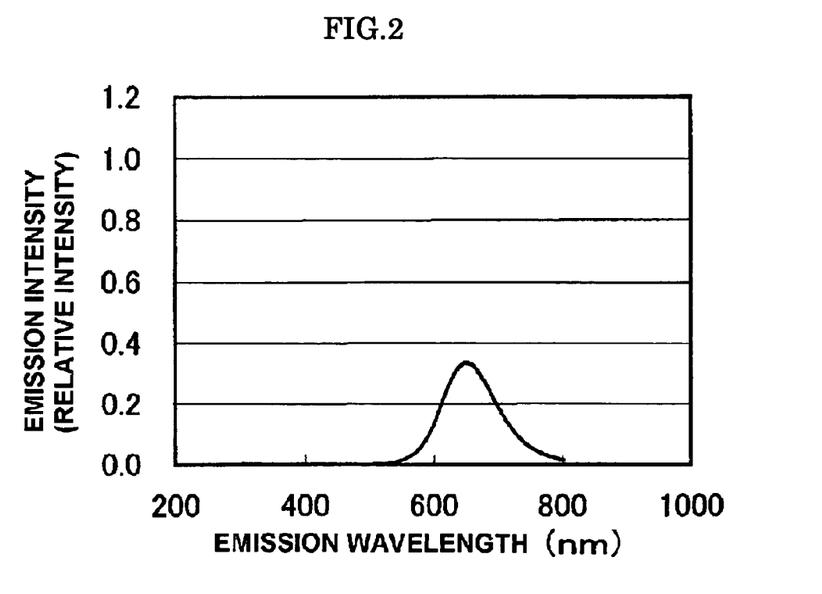
FIG. 2 is a view showing an emission spectrum of the phosphor according to the example 1.

Further, the phosphor sample was irradiated with the electron beam, with the excitation current value set at 10 μA, and the emission spectrum was measured. The measurement result is shown in FIG. 2. In FIG. 2, the emission intensity of the phosphor according to the example 1 is taken on the vertical axis, and a wavelength of light is taken on the horizontal axis. However, the emission intensity is shown by the relative intensity, which is the standardized value, with the relative intensity of the emission intensity defined as 1.00 when the substrate sample of the phosphor according to the comparative example 1 as will be described later is irradiated with the electron beam, with the excitation current value set at 10 μA. As shown in FIG. 2, the phosphor sample showed an emission spectrum with a peak at 653.5 nm, having a large half value width. Also, a luminance under irradiation of the electron beam, with the excitation current value set at 10 μA, was measured. The measurement result is shown in table 2.

Comparative Example 1

Figure 3:
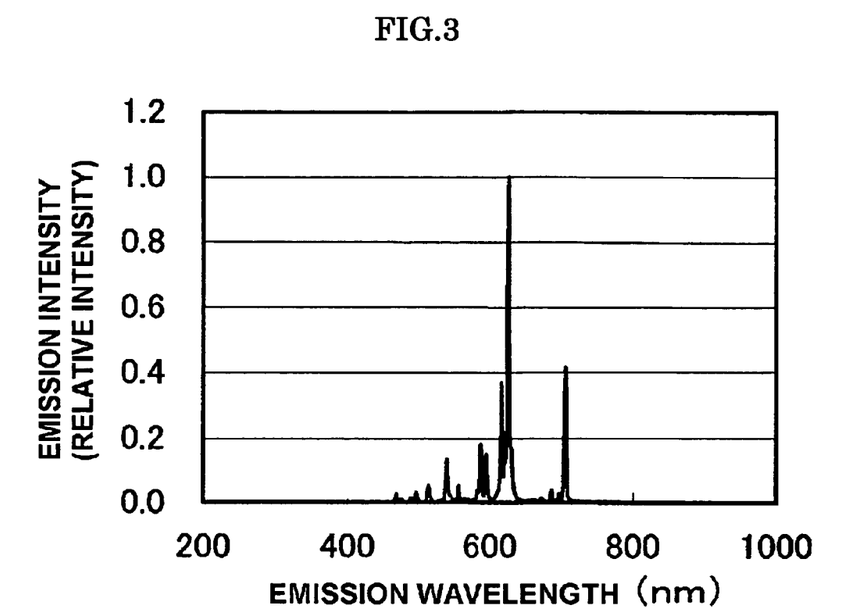
FIG. 3 is a view showing the emission spectrum of the phosphor according to a comparative example 1.

As the phosphor according to a comparative example, by using $Y_2O_2S$:$Eu^{3+}$, which is a red phosphor for a commercially available color cathode ray tube, the substrate sample according to the comparative example 1 was manufactured in the same way as the example 1. Then, the emission intensity of the substrate sample was measured when the excitation current value of the electron beam was changed 0.1 μA to 30 μA, and the luminance and the emission spectrum were measured under the irradiation of the electron beam, with the excitation current value set at 10 μA. Then, the measurement result of the emission intensity was shown in table 1, which was connected by broken line in FIG. 1. The measurement result of the emission spectrum is shown in FIG. 3. In FIG. 3, in the same way as FIG. 2, the emission intensity of the phosphor is taken on the vertical axis as the relative intensity, and the wavelength of the light is taken on the horizontal axis.

TABLE 1

| EXCITATION CURRENT VALUE (μA) | EMISSION INTENSITY (RELATIVE INTENSITY) | |
|---|---|---|
| | EXAMPLE 1 | COMPARATIVE EXAMPLE 1 |
| 0.1 | 0.14 | 0.25 |
| 0.3 | 0.34 | 0.48 |
| 0.5 | 0.49 | 0.59 |
| 0.7 | 0.60 | 0.67 |
| 1 | 0.72 | 0.74 |
| 3 | 1.11 | 0.91 |
| 5 | 1.28 | 0.96 |
| 7 | 1.37 | 0.98 |
| 10 | 1.44 | 1.00 |
| 30 | 1.48 | 1.00 |

TABLE 2

| | RELATIVE LUMINANCE (RELATIVE INTENSITY) |
|---|---|
| EXAMPLE 1 | 1.57 |
| COMPARATIVE EXAMPLE 1 | 1.00 |

(Comparison Between the Example 1 and the Comparative Example 1)

As clarified from the table 1 and FIG. 1, the result was that the phosphor according to the example 1 had a higher emission intensity compared to the commercially available $Y_2O_2S:Eu^{3+}$, which was the comparative example 1, when the excitation current of 3 μA or more was run. In addition, when the phosphor of the comparative example 1 was irradiated with the electron beam, with the excitation current set at 7 μA or more, almost a luminance saturation state occurs. Meanwhile, the luminance saturation state does not occur in the phosphor according to the example 1, even when the phosphor was irradiated with the electron beam, with the excitation current set at 10 μA or more. As a result, when both of the phosphors were irradiated with the electron beam, with the excitation current set at 30 μA, the emission intensity of the example 1 was 1.48 times that of the comparative example 1. Namely, it was found that the phosphor according to the present invention hardly allowed the luminance saturation to occur, and a strong emission could be obtained by increasing the excitation current of the electron beam to irradiate.

Also, as clarified from the table 2, when the phosphor sample according to the example 1 was irradiated with the electron beam, under the excitation current which is set at 10 μA, the luminance obtained therefrom was 1.57 times that of the commercially available $Y_2O_2S:Eu^{3+}$ according to the comparative example 1.

Further, the commercially available $Y_2O_2S:Eu^{3+}$ according to the comparative example 1 exhibited the emission spectrum with a sharp peak at 626.2 nm. Meanwhile, the phosphor sample according to the example 1 exhibited the emission spectrum with a peak at 653.5 nm, having a large half value width. In addition, an energy of light emission in the phosphor sample according to the example 1 shown by an area surrounded by a curve of the emission spectrum was 3 times larger than that of the phosphor sample according to the comparative example 1.

As described above, it appears that the phosphor according to the example 1 is suitable as the red phosphor of the color display apparatus in which the phosphor for the electron beam excitation is used, because the deterioration in the emission efficiency is small even when the excitation density of the electron beam is increased under the increase in the excitation current of the electron beam, and a high luminance can be maintained.

Example 2

Next, the commercially available $Ca_3N_2$(2N), AlN(3N), $Si_3N_4$(3N), $Eu_2O_3$(3N) were prepared. Each raw material was measured so that the molar ratio of each element was Ca:Al:Si:Eu=0.98:1:1:0.02, and mixed in the glove box in the nitrogen atmosphere by using the mortar. The raw material thus mixed was filled in the boron nitride crucible, the temperature was raised at the raising speed of 15° C./min up to 1500° C. in the nitrogen atmosphere, then the temperature was maintained and the raw materials were fired for 24 hours at 1500° C., and thereafter cooled from 1500° C. to 200° C. for 1 hour, and then cooled up to the room temperature, to obtain the phosphor expressed by the composition formula $Ca_{0.98}AlSiN_3:Eu_{0.02}$. The phosphor thus obtained was crushed by using the mortar. The mean particle size of the powder thus manufactured was 6.74 μm.

The powder of the phosphor thus manufactured was dispersed in the solution, and uniformly applied on the copper substrate by using the coagulating-sedimentation process in which the water glass was used, to obtain the substrate sample for evaluating the emission characteristics of the phosphor according to the example 2. At this time, by changing the amount of the phosphor to be applied on the substrate, three different kinds of substrate samples (substrate samples 1 to 3) of the phosphor film thickness were manufactured. The phosphor film thickness in the substrate sample thus manufactured and a phosphor coating amount per unit area are shown in table 3. The phosphor film thickness of each substrate sample thus manufactured was obtained by measuring a thickness of the substrate on which the phosphor was applied and the thickness of the substrate after the phosphor film was peeled off by a micro meter, and from a difference between the thickness. The phosphor film thickness of each substrate sample thus measured was 96.5 μm in the substrate sample 1, 61.3 μm in the substrate sample 2, and 34.3 μm in the substrate sample 3, respectively. Moreover, the phosphor coating amount per each unit area of each substrate sample thus manufactured was obtained by measuring a weight of the substrate on which the phosphor was applied, and the weight of the substrate after the phosphor film was peeled off, then calculating the phosphor coating amount from the difference between the weights, and thereafter dividing the phosphor coating amount thus calculated by a surface area of the substrate sample. The phosphor coating amount per unit area of each substrate sample thus measured was 11.3 $mg/cm^2$ in the substrate sample 1, 6.56 $mg/cm^2$ in the substrate sample 2, and 3.62 $mg/cm^2$ in the substrate sample 3, respectively.

Figure 4:
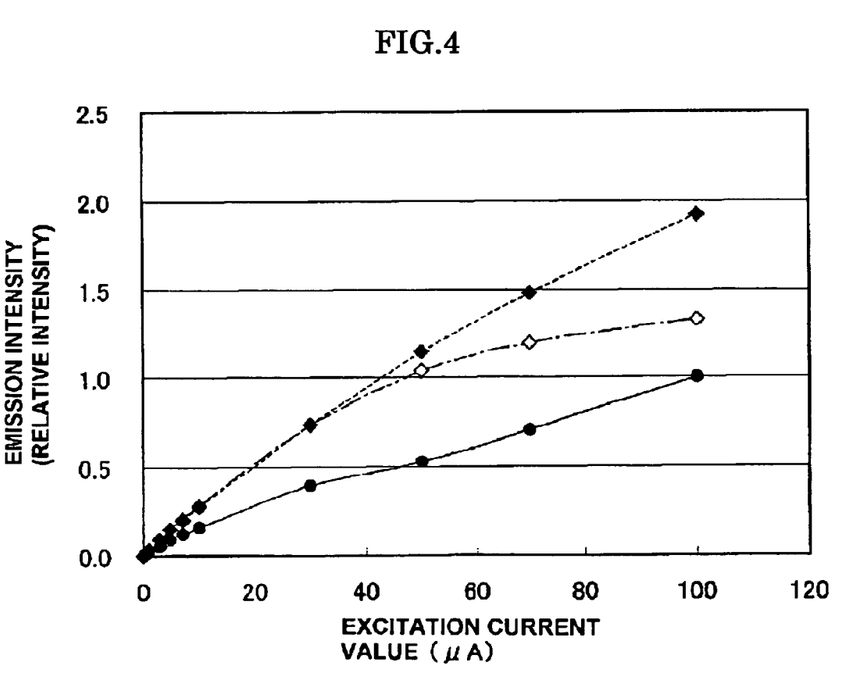
FIG. 4 is a view showing the relation between an excitation current value of the electron beam, with which the phosphor according to the example 2 is irradiated, and the emission intensity of the phosphor.

Each substrate sample thus manufactured was irradiated with the electron beam, with the electron beam accelerating voltage value set at 25 kV and the electron beam irradiating area set at 8×4 mm, and the emission intensity of the substrate sample was measured when the excitation current value of the electron beam was changed from 0.1 μA to 100 μA. The measurement result is shown in table 4 and FIG. 4. However, the emission intensity is shown by the relative intensity, which is the standardized value, with the emission intensity defined as 1.00, under the current of 100 μA which is run through the substrate sample 1. Also, FIG. 4 is a graph in which the excitation current value is taken on the horizontal axis, the emission intensity (relative energy intensity) of the phosphor is taken on the vertical axis, and data of the substrate sample 1, data of the substrate sample 2, and data of the substrate sample 3 are plotted by ●, □, and |, respectively, and connected by solid line, one dot chain line, and broken line, respectively.

Figure 5:
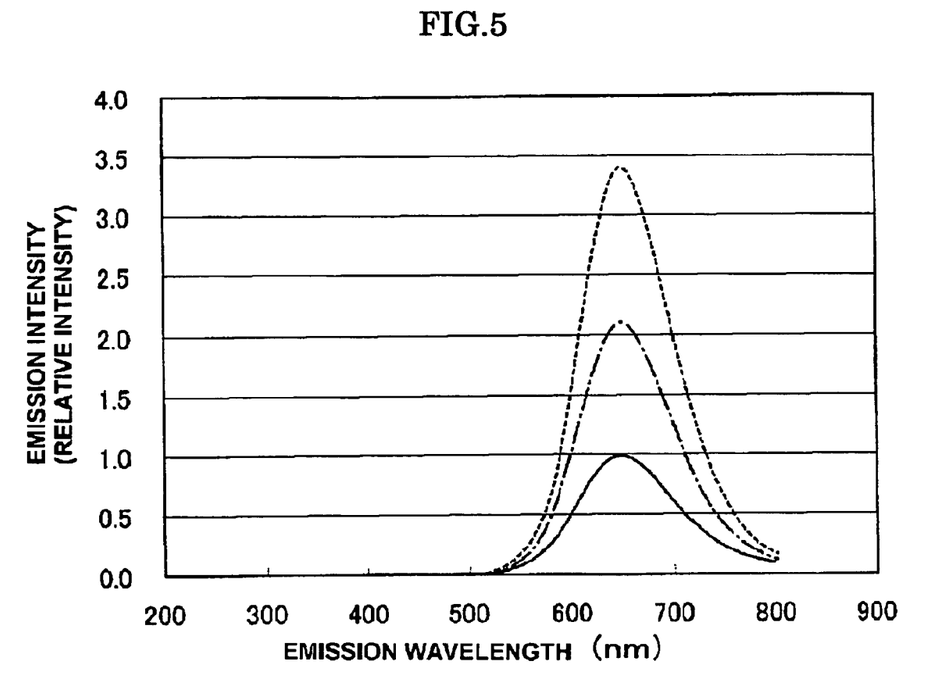
FIG. 5 is a view showing the emission spectrum of the phosphor according to the example 2.

In addition, the phosphor sample was irradiated with the electron beam, with the excitation current value set at 100 μA, and the emission spectrum was measured. The measurement result is shown in FIG. 5. In FIG. 5, the emission intensity of the phosphor according to the example 2 is taken on the vertical axis, a wavelength of light is taken on the horizontal axis, and the emission spectrum of the substrate sample 1 is shown by solid line, and the emission spectrum of the substrate sample 2 is shown by one dot chain line, and the emission spectrum of the substrate sample 3 is shown by broken line. Wherein, the emission intensity is shown by the relative intensity, which is the standardized value, with the relative intensity of the emission intensity defined as 1.00 when the substrate sample 1 is irradiated with the electron beam, with the excitation current value set at 100 μA. As shown in FIG. 5, each substrate sample exhibited the emission spectrum with a peak at about 650 nm, having a large half value width. Also, the luminance was measured, when the phosphor sample was irradiated with the electron beam, with the excitation current value set at 100 μA. The measurement result is shown in table 5. Wherein, the luminance is shown by the relative intensity, which is the standardized value, with the relative intensity of luminance defined as 1.00 when the substrate sample 1 is irradiated with the electron beam, with the excitation current value set at 100 μA.

TABLE 3

| | PHOSPHOR FILM THICKNESS (μm) | PHOSPHOR COATING AMOUNT PER UNIT AREA (mg/cm$^2$) |
|---|---|---|
| SUBSTRATE SAMPLE 1 | 96.5 | 11.3 |
| SUBSTRATE SAMPLE 2 | 61.3 | 6.56 |
| SUBSTRATE SAMPLE 3 | 34.3 | 3.62 |

TABLE 4

| EXCITATION CURRENT VALUE (μA) | EMISSION INTENSITY (RELATIVE INTENSITY) | | |
|---|---|---|---|
| | SUBSTRATE SAMPLE 1 | SUBSTRATE SAMPLE 2 | SUBSTRATE SAMPLE 3 |
| 0.1 | 0.00 | 0.00 | 0.00 |
| 0.3 | 0.01 | 0.01 | 0.01 |
| 0.5 | 0.01 | 0.02 | 0.02 |
| 0.7 | 0.02 | 0.02 | 0.02 |
| 1 | 0.02 | 0.03 | 0.03 |
| 3 | 0.06 | 0.10 | 0.09 |
| 5 | 0.09 | 0.15 | 0.15 |
| 7 | 0.12 | 0.21 | 0.20 |
| 10 | 0.16 | 0.29 | 0.28 |
| 30 | 0.39 | 0.74 | 0.74 |
| 50 | 0.53 | 1.04 | 1.15 |
| 70 | 0.71 | 1.19 | 1.48 |
| 100 | 1.00 | 1.32 | 1.92 |

TABLE 5

| | RELATIVE LUMINANCE (RELATIVE INTENSITY) |
|---|---|
| SUBSTRATE SAMPLE 1 | 1.00 |
| SUBSTRATE SAMPLE 2 | 1.60 |
| SUBSTRATE SAMPLE 3 | 2.43 |

(Influence of the Phosphor Film Thickness)

As clarified from the table 4 and FIG. 4, in regards to the substrate sample according to the example 2, the sample with thinner phosphor film thickness exhibits a higher emission intensity under the irradiation of the electron beam. Particularly, the difference in the emission intensity was remarkably exhibited under the irradiation of the electron beam of 30 μA or more. The emission intensity of each substrate sample was compared under the irradiation of the electron beam, with the excitation current value set at 100 μA. Then, as a result, it was found that the emission intensity of the substrate sample 2 with the film thickness of 61.3 μm and having the phosphor coating amount of 6.56 mg/cm$^2$ per unit area showed 1.32 times that of the substrate sample 1 with the film thickness of 96.5 μm and having the phosphor coating amount of 11.3 mg/cm$^2$ per unit area, thereby forming the largest phosphor film thickness. Meanwhile, the emission intensity of the substrate sample 3 with the film thickness of 34.3 μm and having the phosphor coating amount of 3.62 mg/cm$^2$ per unit area, thereby forming the smallest phosphor film thickness, showed 1.92 times that of the aforementioned substrate sample 1. Namely, it was found that the phosphor according to the present invention exhibited an extremely strong light emission when the phosphor was irradiated with the electron beam of a particularly high excitation current, by making the phosphor film thickness to be applied on the substrate small.

Further, as shown in FIG. 5, the emission spectrum of each substrate sample under the irradiation of the electron beam, with the excitation current value set at 100 μA, showed the emission spectrum with a peak at about 650 nm and having a large half value width. In addition, the peak intensity of the emission spectrum of each substrate sample was compared. Then, as a result, it was found that the emission intensity of the substrate sample 2 with the film thickness of 61.3 μm and having the phosphor film thickness of 6.56 mg/cm$^2$ per unit area showed 2.12 times that of the substrate sample 1 with the film thickness of 96.5 μm and having the phosphor coating amount of 11.3 mg/cm$^2$ per unit area, thereby forming the largest phosphor film thickness. Meanwhile, the emission intensity of the substrate sample 3 with the film thickness of 34.3 μm and having the phosphor coating amount of 3.62 mg/cm2 per unit area, thereby forming the smallest phosphor film thickness showed 3.42 times that of the aforementioned substrate sample 1.

Also, as shown in table 5, under the irradiation of the electron beam, with the excitation current value set at 100 μA, the luminance of the substrate sample 2 showed 1.60 times that of the substrate sample 1, and the luminance of the substrate sample 3 showed 2.43 times that of the substrate sample 1.

From the result shown above, it was found that by making the phosphor film thickness to be applied on the substrate small, an extremely strong emission and luminance could be exhibited under the irradiation of the electron beam with particularly high excitation current.

As described above, it appears that the phosphor according to the example 2 is suitable as the red phosphor of the color display apparatus in which the phosphor for the electron beam excitation is used, because it is possible to exhibit the extremely strong emission and luminance when the excitation density of the electron beam is increased under the irradiation of the electron beam of high excitation current value, and particularly is preferable for being used as the phosphor film with film thickness of 65 μm or less and with the coating amount per unit area set at 7.0 mg/cm$^2$ or less.

What is claimed is:

1. A phosphor film for an electron beam excitation, manufactured by using the phosphor for an electron beam excitation, expressed by a composition formula MmAaBbOoNn:Z (wherein element M is at least one or more kind of element having bivalent valency, element A is at least one or more kind of element having tervalent valency, element B is at least one or more kind of element having tetravalent valency, O is oxygen, N is nitrogen, element Z is the element acting as an activator in the phosphor, satisfying o≧0, n=2/3m+a+4/3b−2/3o, m=a=b=1), wherein a film thickness is 65 μm or less.

2. A phosphor film for an electron beam excitation, manufactured by using the phosphor for an electron beam excitation, expressed by a composition formula MmAaBbOoNn:Z (wherein the element M is at least one or more kind of element selected from the group consisting of Mg, Ca, Sr, Ba, and Zn, the element A is at least one or more kind of element selected from the group consisting of B (boron), Al and Ga, the element B is Si and/or Ge, and the element Z is at least one or more kind of element selected from rare earth elements or transitional metal elements, satisfying o≧0, n=2/3m+a+4/3b−2/3o, m=a=b=1), wherein a film thickness is 65 μm or less.

3. A phosphor film for an electron beam excitation, manufactured by using the phosphor for an electron beam excitation, expressed by a general formula CaAlSiN$_3$:Eu, wherein a film thickness is 65 μm or less.

4. A phosphor film for an electron beam excitation, manufactured by using the phosphor for an electron beam excitation, expressed by a composition formula MmAaBbOoNn:Z (wherein element M is at least one or more kind of element having bivalent valency, element A is at least one or more kind of element having tervalent valency, element B is at least one or more kind of element having tetravalent valency, O is oxygen, N is nitrogen, element Z is the element acting as an activator in the phosphor, satisfying o≧0, n=2/3m+a+4/3b−2/3o, m=a=b=1), wherein a phosphor coating amount is 7.0 mg/cm$^2$ or less per unit area.

5. A phosphor film for an electron beam excitation, manufactured by using the phosphor for an electron beam excitation, expressed by a composition formula MmAaBbOoNn:Z (wherein the element M is at least one or more kind of element selected from the group consisting of Mg, Ca, Sr, Ba, and Zn, the element A is at least one or more kind of element selected from the group consisting of B (boron), Al and Ga, the element B is Si and/or Ge, and the element Z is at least one or more kind of element selected from rare earth elements or transitional metal elements, satisfying o≧0, n=2/3m+a+4/3b−2/3o, m=a=b=1), wherein a phosphor coating amount is 7.0 mg/cm$^2$ or less per unit area.

6. A phosphor film for an electron beam excitation, manufactured by using the phosphor for an electron beam excitation, expressed by a general formula CaAlSiN$_3$:Eu, wherein a phosphor coating amount is 7.0 mg/cm$^2$ or less per unit area.

7. A color display apparatus, using the phosphor film according to claim 1.

8. A color display apparatus, using the phosphor film according to claim 4.

* * * * *